United States Patent [19]
Buhler et al.

[11] Patent Number: 5,898,757
[45] Date of Patent: Apr. 27, 1999

[54] METHOD AND SYSTEM FOR PROCESSING EMERGENCY SERVICE CALLS

[75] Inventors: Gerhard Buhler, Little Silver; Thomas Arthur Dunn, Edison; Gerald Kersus, Wall; Donald E. Levy, Holmdel; Lily Mui, Middletown, all of N.J.

[73] Assignee: AT&T Corp, Middletown, N.J.

[21] Appl. No.: 08/678,835

[22] Filed: Jul. 12, 1996

[51] Int. Cl.⁶ .................................................. H04M 11/00
[52] U.S. Cl. ............................ 379/45; 379/142; 379/265
[58] Field of Search .................................. 379/45, 38, 39, 379/40, 46, 49, 142, 93.23, 93.25, 127, 265, 267

[56] References Cited

U.S. PATENT DOCUMENTS

| | | | |
|---|---|---|---|
| 5,109,399 | 4/1992 | Thompson | 379/45 |
| 5,311,569 | 5/1994 | Brozovich et al. | 379/45 |
| 5,703,943 | 12/1997 | Otto | 379/265 |

*Primary Examiner*—Stella Woo

[57] ABSTRACT

An operator service terminal system connected to a telephone system switch retains the identifications of calling subscribers. Each operator terminal includes memory for storing at least one more subscriber identification than the number of loops served by that terminal. Once an operator services a call, it is not necessary to signal the telephone system switch to identify the caller if the identification is still in memory. In emergency situations, if a call is terminated before a caller can convey the location of the emergency, the calling party identification information can be used to call the caller back or can be relayed to emergency personnel for appropriate action.

11 Claims, 1 Drawing Sheet

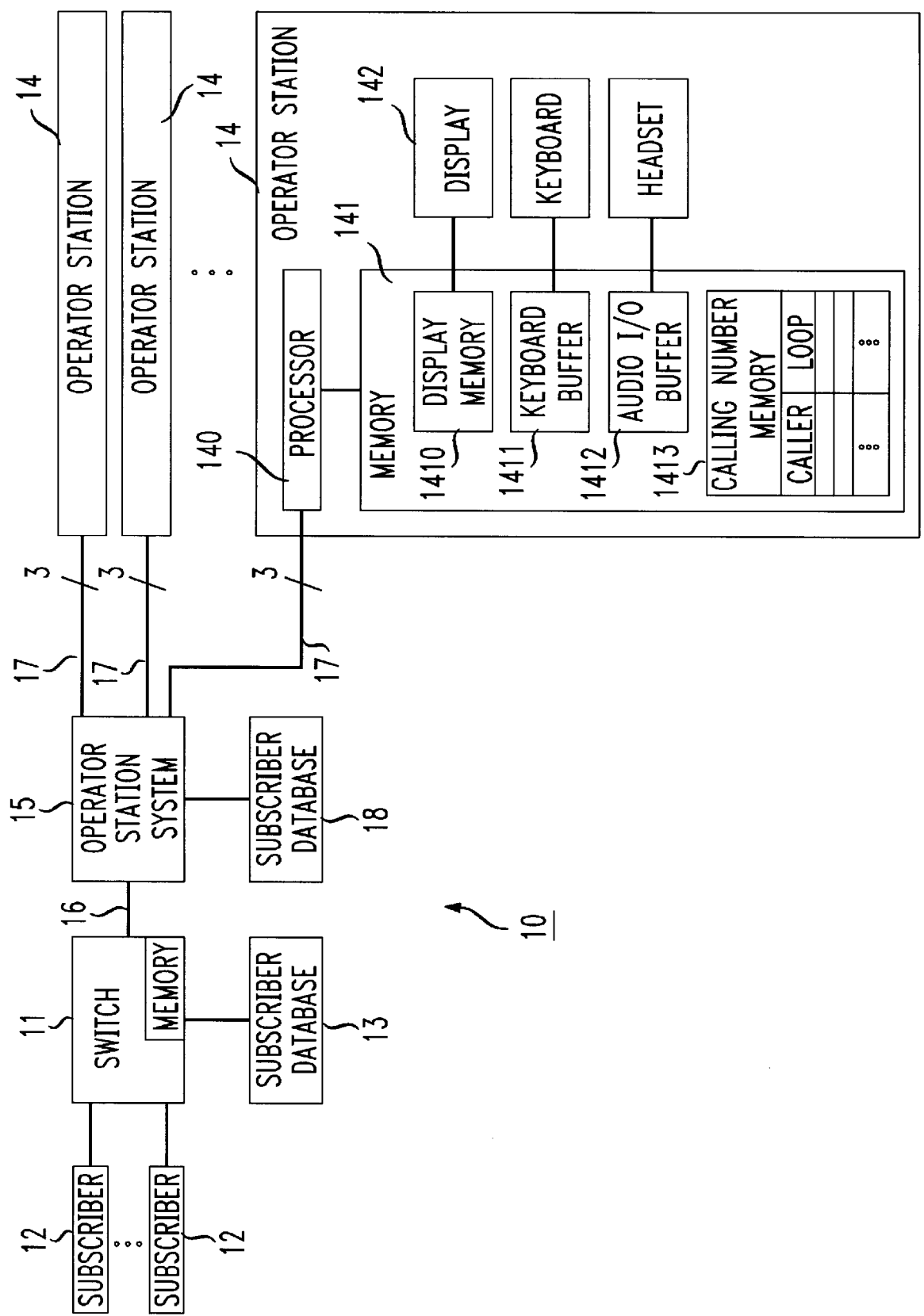

METHOD AND SYSTEM FOR PROCESSING EMERGENCY SERVICE CALLS

BACKGROUND OF THE INVENTION

This invention relates to telephone operator call processing systems. More particularly, this invention relates to a method and system in which, when a telephone operator receives an emergency call, data regarding the caller is made more readily available.

Many localities are served by emergency response facilities to which residents can direct telephone calls reporting the existence of emergency situations. These emergency response facilities are commonly served by specialized telephone numbers, such as "911" in the United States, or "999" in Great Britain. Such facilities are typically equipped with operator terminals that display the name and location of the calling party, so that even if the caller is unable to complete a message to the emergency operator, the operator has sufficient information to dispatch emergency personnel.

Prior to the introduction of such emergency response facilities, it was common to seek emergency assistance by dialing the local telephone operator—i.e., by dialing "0." As a result, many people, particularly older people or people under the stress of an emergency situation, still tend to dial "0" to reach emergency personnel. In addition, some localities have not implemented a dedicated emergency response number such as "911." Also, if the local telephone company is unable to complete a call to an emergency response center, it may re-route the call to the local operator. Normally, the local operator is able to obtain all of the necessary information from the caller and relay it to the appropriate emergency personnel. However, in this case, if the caller is unable to give all of the necessary information for any reason and the call is terminated before the operator can dispatch emergency personnel, the operator station does not normally retain, or even display, the necessary name and address information referred to above. The local operator must then transmit a special signal to the local telephone switch to which the operator station is connected to retrieve the telephone number of the caller. The operator can then (1) attempt to contact the caller, or (2) relay the information to an emergency response facility as described above, which can use the telephone number to retrieve the name and address and dispatch emergency personnel.

While the necessary telephone number information is stored at the local switch, the ability of a local operator to retrieve that information is dependent on the signaling method in use between the operator station and the local switch, and on the ability of that signaling method to support the request to retrieve the information. And because there can be multiple line instances, or "loops," at the operator station, it is not sufficient to display the last number that called the operator. Rather, the last number for each loop must be available.

For example, in one common configuration, the local switch is one sold under the trademark 5ESS® by Lucent Technologies, and the operator stations operate under a system known as Operator Service Position System. Different types of signaling may be used between the switch and the operator stations. Under one type of signaling known as Feature Group C with Modified Operator Signaling, the local operator would be able to query the switch to retrieve the information. However, under a newer form of signaling known as Feature Group D, the information could not be retrieved by the operator without redefining the signaling protocol.

It would be desirable to be able to provide a telephone operator terminal system that is able to retain caller identifying information without regard to the type of signaling in effect between the operator terminal and the local telephone switch, and without regard to the number of line instances at the operator terminal.

SUMMARY OF THE INVENTION

It is an object of this invention to provide a telephone operator terminal system that is able to retain caller identifying information (including, but not limited to, access line directory number or billing directory number) without regard to the type of signaling in effect between the operator terminal and the local telephone switch, and without regard to the number of line instances at the operator terminal.

In accordance with the present invention, there is provided a telephone call processing system including at least one operator terminal having a plurality of line instances and having a memory. At least one system switch is coupled to a plurality of subscribers and to the operator terminal for connecting a call by one of the subscribers to one of the line instances of the operator terminal, and for transmitting to the terminal, with the subscriber call, data identifying that one of the subscribers. A memory controller in the operator terminal stores the identifying data in the memory, along with association data correlating the identifying data with that one of the line instances, and retains the identifying data and the association data in the memory after termination of the subscriber call.

A method of operating the system is also provided.

BRIEF DESCRIPTION OF THE DRAWINGS

The above and other objects and advantages of the invention will be apparent upon consideration of the following detailed description, taken in conjunction with the accompanying FIGURE, which is a schematic representation of a system according to the present invention.

DETAILED DESCRIPTION OF THE INVENTION

The present invention renders the problem of retrieving caller identifying information (which could be the telephone number only, or could include name and/or address information) at the operator station independent of the type of signaling between the switch and the operator terminal or station. This is achieved by relying on the fact that, no matter what type of signaling is used, the caller identifying information is always transmitted while the call is connected to the operator station. Therefore, according to the present invention, that information is stored at that time.

Thus, using a type of signaling known as MF signaling, the identifying information is typically the billing directory number of the calling party. This number can be used, by reference to an appropriate database, by the either the operator or, more likely, the emergency personnel, to retrieve the caller's name and address. With another type of signaling known as SS7 signaling, the identifying information may include both the billing directory number and the access line directory number, which could be different in the case of a business subscriber. Knowing that a caller is calling from a business may give the operator or emergency personnel useful additional information. For example, the operator in attempting to call back would know to call the access line directory number rather than the billing directory number. Either way, the invention is independent of the signaling used and eliminates the need for coordination among various system vendors.

A preferred embodiment of a system 10 according to the present invention is shown in the FIGURE. System 10 includes a central office switch 11, such a switch sold under the trademark 5ESS® by Lucent Technologies, connected to one or more telephone subscribers 12. Optionally associated with switch 11 is a subscriber database 13, which may be stored on any suitable media such as one or more disk drives connected to switch 11, storing subscribers' telephone numbers, and optionally correlating subscribers' telephone numbers with their names and addresses.

A number (one or more) of operator stations 14 preferably are provided for those calls which require operator intervention. Operator stations 14 preferably are connected to switch 11 through an operator station system 15, preferably connected to switch 11 by trunk 16. Operator station system 15, which may be the Operator Service Position System provided by Lucent Technologies, passes telephone calls through to operator stations 14 along with relevant data, including the customer identification data under consideration here, needed by operator station 14 to service the calls. Each operator station 14 is preferably connected to operator station system 15 by a plurality of circuits or "loops" (three shown), preferably allowing it to handle that many calls simultaneously.

Each operator station 14 preferably includes a processor 140 and memory 141, and a display 142, a keyboard 143 and a headset 144 for use by the operator, all preferably conventional and well known to those skilled in the art. Memory 141 preferably includes memory areas for various different functions, including display memory 1410 for holding the current contents of display 142, a keyboard buffer 1411 for holding data entered by the operator on keyboard 143, and an audio input/output buffer for processing the voice portion of the call through the operator headset 144.

In addition, in accordance with the present invention, memory 141 preferably includes memory resources for a table 1413 to store the identifications of recent callers and an association of each caller with the particular loop on which the call was carried at operator station 14. Preferably, the allocated resources are sufficient to hold the identifications of more callers than there are loops, most preferably at least one more than the number of loops. Thus, where there are three loops, there preferably would be space allocated to hold four identifications. This would allow for storage of identifying data for the current call on each loop, plus the most recently terminated call. Thus, in a situation where a new call arrives on the loop from which the call was dropped, before the operator had a chance to retrieve the identifying data, the identifying data will not be overwritten by the new call. If space were not allocated in table 1413 to store more identifications than the number of loops, the needed identifying data might be overwritten. Clearly, storage for at least one additional identification should be provided. Additional storage may also be provided.

In operation of system 10, if a caller dialed an operator at one of operator stations 14, by dialing "0" or another appropriate code, the system switch 11 would retrieve the caller's identifying information stored in the switch, and send that information, along with the call, over trunk 16 to operator station system 15, which would format the incoming data and pass the formatted call on to one of operator stations 14. Switch 11 would make a record in its own memory 110 as to which subscriber placed the call.

The identifying information accompanying the call would preferably be signaled over trunk 16 in a conventional format including the billing directory number, and may also include the access line directory number along with the telephone number. In addition to being displayed on display 142, the identifying information preferably would be stored in the "CALLER" "column" of memory "table" 1413, in which also would be stored, in the "LOOP" column, the identification of the loop on which the call was received at operator station 14. If only the telephone number is sent by switch 11 and stored in the CALLER column of table 1413, a separate subscriber database 18 could optionally be made available to operator station system 15.

If an operator received an emergency call at operator station 14 and the caller was unable to complete the call, the operator would be able to call up the identifying data, by loop number, from table 1413. The data would be displayed on display 142, and the operator would be able to dispatch emergency personnel (if the identifying data include the name and address or if database 18 is provided) or, more preferably, attempt to call the caller back or relay the information to an emergency response center which would dispatch the emergency personnel. No signaling between operator station system 15 and switch 11 would be necessary to recall the subscriber identification. Therefore the mode of signaling is unimportant, as long as the information is conveyed at the time of the call itself.

Thus it is seen that a telephone operator terminal system that is able to retrieve caller identifying information without regard to the type of signaling in effect between the operator terminal and the local telephone switch, and without regard to the number of line instances at the operator terminal.

What is claimed is:

1. A method for use with a telephone system, said system including a system switch connected to a plurality of subscribers and to an operator service terminal capable of handling a plurality of line instances, said system connecting calls by said subscriber to said terminal, said method comprising the steps of:

connecting a call from one of said subscribers to one of said line instances at said operator terminal;

transmitting to said terminal, with said call, data identifying said subscriber;

storing said identifying data, and association data correlating said identifying data with said one of said line instances, at said operator terminal; and retaining said identifying data and said association data at said terminal after termination of said call.

2. The method of claim 1 wherein said retaining step comprises retaining said identifying data for a number of calls, said number exceeding said plurality.

3. The method of claim 2 wherein said number exceeds said plurality by one.

4. The method of claim 1 wherein said identifying data includes an access line directory number.

5. The method of claim 1 wherein said identifying data includes a billing directory number.

6. The method of claim 1 wherein said identifying data includes a telephone number.

7. The method of claim 1 wherein said identifying data includes address information.

8. A telephone call processing system, said system comprising:

at least one operator terminal having a plurality of line instances and having memory;

at least one system switch coupled to a plurality of subscribers and to said operator terminal for connecting a call by one of said subscribers to one of said line instances of said terminal, and for transmitting to said terminal, with said subscriber call, data identifying said one of said subscribers;

a memory controller in said operator terminal for storing said identifying data in said memory, along with association data correlating said identifying data with said one of said line instances, and retaining said identifying data and said association data in said memory after termination of said subscriber call.

9. The telephone call processing system of claim 8 wherein said memory controller stores in said memory identifying data for a number of calls, said number exceeding said plurality.

10. The telephone call processing system of claim 5 wherein said number exceeds said plurality by one.

11. A method for use with a telephone system, said system including a system switch connected to a plurality of subscribers and to an operator service terminal capable of handling a plurality of line instances, said system connecting calls by said subscriber to said terminal, said method comprising the steps of:

coupling said system switch to said operator terminal and said plurality of subscribers;

connecting a call via a type of signaling between said system switch and said operator terminal, from one of said subscribers to one any one of said line instances at said operator terminal;

transmitting to said operator terminal, with said call, data identifying said subscriber independent of the type of signaling between said system switch and said operator terminal;

storing said identifying data, and association data correlating said identifying data with said one of said line instances, at said operator terminal; and retaining said identifying data and said association data for a number of calls at said terminal after termination of said call, said number of calls exceeds said plurality of line instances.

* * * * *